United States Patent [19]

Yeh

[11] Patent Number: 4,877,297

[45] Date of Patent: Oct. 31, 1989

[54] RECONFIGURABLE OPTICAL INTERCONNECT USING DYNAMIC HOLOGRAM

[75] Inventor: Pochi A. Yeh, Thousand Oaks, Calif.

[73] Assignee: Rockwell International Corporation, El Segundo, Calif.

[21] Appl. No.: 187,807

[22] Filed: Apr. 29, 1988

[51] Int. Cl.$^4$ .................... G02F 1/01; G03H 1/02
[52] U.S. Cl. .................... 350/3.68; 350/3.64; 350/3.67; 350/354
[58] Field of Search .............. 350/354, 355, 3.6, 3.62, 350/3.64, 3.67, 3.68

[56] References Cited

U.S. PATENT DOCUMENTS

| | | | |
|---|---|---|---|
| 3,819,248 | 6/1974 | Takeda et al. | 350/3.68 X |
| 3,847,465 | 11/1974 | Micheron et al. | 350/3.64 |
| 3,915,549 | 10/1975 | Amodei et al. | 350/3.64 |
| 4,025,195 | 5/1977 | Ebersole | 356/71 |
| 4,124,278 | 11/1978 | Grinberg | 350/342 |
| 4,186,002 | 1/1980 | Heller et al. | 350/3.62 X |
| 4,212,536 | 7/1980 | Bencze | 356/71 |
| 4,320,966 | 3/1982 | Reyblatt | 356/34 |
| 4,372,649 | 2/1983 | Kellie | 350/162.12 |
| 4,386,414 | 5/1983 | Case | 350/3.73 X |
| 4,492,468 | 1/1984 | Huignard et al. | 350/3.64 X |
| 4,505,536 | 3/1985 | Huignard et al. | 350/3.64 |
| 4,588,255 | 5/1986 | Tur | 350/96.16 |
| 4,592,004 | 5/1986 | Bocker | 350/96.14 |
| 4,620,293 | 10/1986 | Schlunt | 364/845 |
| 4,633,427 | 12/1986 | Bocker | 350/162.12 |
| 4,633,428 | 12/1986 | Byron | 350/96.14 |
| 4,641,273 | 2/1987 | Casasent | 364/822 |
| 4,651,297 | 3/1987 | Schlunt | 364/822 |

OTHER PUBLICATIONS

Chow, Phase Locking of Lasers by an Injected Signal, Optics Letters, vol. 7, p. 417 (1982).

Indebetouw, Real-Time Incoherent Subtraction of Irradiance, Applied Optics, vol. 19, p. 1218 (1980).

Ja, Real-Time Incoherent Subtraction in Four-Wave Mixing with Photorefractive $Bi_{120}BeO_{20}$ Crystals, Optics Communications, vol. 42, p. 377 (1982).

Morimoto, A Picosecond Optical Gate using Photo-Induced Grating, Japanese Journal of Applied Physics, vol. 20, p. 1129 (1981).

Patorski, Subtraction and Addition of Optical Signals using a Double-Grating Shearing Interferometer, Optics Communications, vol. 29, p. 13 (1979).

Primary Examiner—Eugene R. Laroche
Assistant Examiner—Nathan W. McCutcheon
Attorney, Agent, or Firm—H. Fredrick Hamann; John J. Deinken

[57] ABSTRACT

A beam of coherent light is coupled into an array of light detectors using a beam splitter for dividing the beam into a probe beam and a pump beam and a spatial light modulator for varying the intensity of the probe beam in a first direction perpendicular to the direction of propagation of the beam. A photorefractive element is positioned to receive the modulated probe beam and the pump beam, the beans being oriented with respect to the photorefractive element and with respect to each other such that photorefractive two-wave mixing within the photorefractive element nonreciprocally transfers energy from the pump beam to the modulated probe beam, which is then detected by the detector array. A first lens system may be positioned in the path of each probe beam between the beam splitter and the spatial light modulator for expanding each probe beam in the first direction, while a second lens system may be positioned in the path of each pump beam between the beam splitter and the photorefractive element for expanding each pump beam in the first direction.

16 Claims, 2 Drawing Sheets

RECONFIGURABLE OPTICAL INTERCONNECT USING DYNAMIC HOLOGRAM

GOVERNMENT RIGHTS

The United States Government has rights in this invention pursuant to a contract awarded by the Defense Advanced Research Projects Agency.

BACKGROUND OF THE INVENTION

This invention is concerned with techniques for processing information which is transmitted optically, such as in an optical communications system or in an optical computer.

The inherent parallelism of optics (i.e., a beam of light can carry different information on different portions of the light beam without interference) and the wide bandwidth which optical systems offer for communication are ideal for real-time image processing, optical interconnection schemes, and associative processing. As a result, optics is emerging as an area of increasing importance in high-speed information processing. Reconfigurable optical interconnections, for example, play a key role in optical computing systems, where such interconnections are used to link arrays of lasers with arrays of detectors. Conceptually, such an interconnection can be achieved by using an optical matrix-vector multiplication, where the input vector represents the signals carried by an array of lasers, the matrix represents the interconnection pattern which is to be implemented, and the output vector represents the signals which are sensed by an array of optical detectors.

When a transparency or a spatial light modulator is used as the interconnection mask in an optical interconnection, an excessively large fraction of the light entering the device is absorbed by the transparency or modulator. If the interconnect is used as a crossbar switch, for example, it exhibits an energy efficiency of only 1/N, where N is the dimension of the array. This excessive energy loss occurs in the device because a fractional portion $(N-1)/N$ of the light energy from each element of the input vector cannot pass through the crossbar mask. Furthermore, this loss, which is sometimes referred to as the fanout energy loss, increases as the dimension N of the array increases. For a 1000×1000 crossbar switch, for example, as much as 99.9% of the input signal can be lost due to fanout. A loss of this magnitude is not acceptable in high speed computing applications, where signals pass through the spatial light modulator more than a billion times per second. This high processing speed would contribute to an enormous fanout energy loss in such a conventional optical interconnection system. In addition to the inherent fanout energy loss, all spatial light modulators have a finite insertion loss due to imperfect transmission properties and the scattering of light. If such insertion losses are also accounted for, the energy efficiency of a crossbar switch is reduced to t/N, where t is the transmittance (t<1) of each of the optical channels through which information is transmitted in the switch.

This efficiency problem has been addressed in the prior art. It is known, for example, to employ a holographic optical element in order to achieve a free space optical interconnection. In this scheme, light from each laser source within the input array is Bragg scattered and redirected to one or more detectors in the output array. Several specific requirements, however, such as alignment, diffraction efficiency, etc., must be met for a holographic optical element to be used for the interconnection of VLSI (Very Large Scale Integration) circuits. In addition, a new hologram must be provided for each new interconnection pattern. Consequently, a need exists for a new optical interconnection scheme which can be easily reconfigured while achieving a high level of efficiency.

SUMMARY OF THE INVENTION

This invention reconfigurable interconnect utilizes the nonreciprocal energy transfer of the two-wave mixing process to achieve a heretofore unachieveable efficiency in a reconfigurable optical interconnect. A beam of coherent light is coupled into an array of light detectors using a beam splitter for dividing the beam into a probe beam and a pump beam and a spatial light modulator for varying the intensity of the probe beam in a first direction perpendicular to the direction of propagation of the beam. A photorefractive element is positioned to receive the modulated probe beam and the pump beam, the beams being oriented with respect to the photorefractive element and with respect to each other such that photorefractive two-wave mixing within the photorefractive element nonreciprocally transfers energy from the pump beam to the modulated probe beam, which is then detected by the detector array.

In a more particular embodiment, the photorefractive element further comprises a photorefractive crystal, such as, for example, $AgGaS_2$, $AgGaSe_2$, $\beta\text{-}BaB_2O_4$, $BaTiO_3$, $Bi_{12}SiO_{20}$, BGO, GaAs, KTN, $KTaO_3$, $LiNbO_3$, $LiTaO_3$, or $SrBaNb_2O_6$.

Moreover, a first lens system may be positioned in the path of each probe beam between the beam splitter and the spatial light modulator for expanding each probe beam in the first direction, while a second lens system may be positioned in the path of each pump beam between the beam splitter and the photorefractive element for expanding each pump beam in the first direction.

In an embodiment designed to couple an array of coplanar, parallel beams of coherent light into an array of light detectors, a beam splitter divides the array into an array of probe beams and an array of pump beams. A two dimensional spatial light modulator varies the intensity of the probe beam array in a first direction perpendicular to the direction of propagation of the probe beam array and in a second direction perpendicular to the first direction and perpendicular to the direction of propagation of the probe beam array. The photorefractive element is positioned to receive the modulated probe beams and the pump beams, the beams being oriented with respect to the photorefractive element and with respect to each other such that photorefractive two-wave mixing within the photorefractive element nonreciprocally transfers energy from each pump beam to the corresponding probe beam.

In addition to enhancements similar to those mentioned above, this embodiment may further include a third lens system positioned in the path of each probe beam between the photorefractive element and the detector array to compress the modulated and amplified probe beam in the second direction.

A method of reconfigurably coupling at least one beam of coherent light into an array of light detectors, involves the steps of dividing each beams into a probe beam and a pump beam and varying the intensity of each probe beam in a first direction perpendicular to the direction of propagation of the probe beam. Each probe beam and each pump beam is then directed into a photorefractive element, with the beams oriented with respect to the photorefractive element and with respect to each other such that photorefractive two-wave mixing within the photorefractive element nonreciprocally transfers energy from each pump beam to the corresponding modulated probe beam. Finally, each modulated probe beam is directed onto the detector array.

DESCRIPTION OF THE INVENTION

Figure 1:
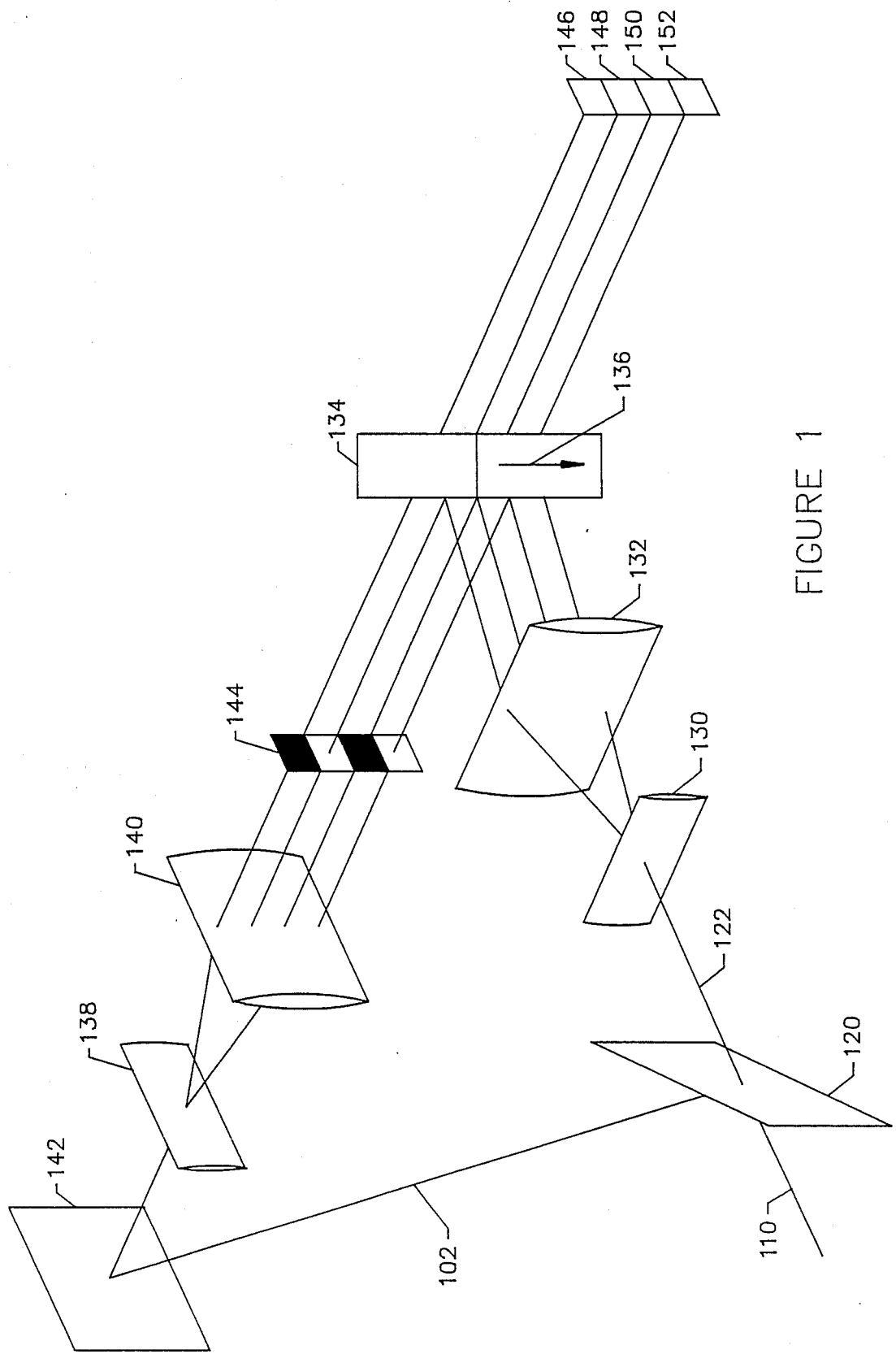
FIG. 1 is a schematic diagram illustrating a reconfigurable optical interconnect constructed according to this invention.

It is an outstanding feature of this invention to employ a dynamic holographic medium, such as a photorefractive crystal, as a reconfigurable optical interconnection device. This reconfigurable interconnect utilizes the nonreciprocal energy transfer which occurs in the two-wave mixing process to achieve an extremely high diffraction efficiency. FIG. 1 is a schematic diagram illustrating a reconfigurable optical interconnect constructed according to this invention. FIG. 1 depicts an interconnection in only one dimension in order to more clearly present the operative concept of this invention. A probe beam 102 containing a small fraction of the intensity of an input laser beam 110 is coupled out of the beam by a beam splitter 120, while the remainder of the beam propagates through the beam splitter to serve as the pump beam 122. The pump beam 12 is expanded by a first lens system, which includes the cylindrical lenses 130 and 132, and is then directed into a photorefractive crystal 134, which has its c axis directed as indicated by the arrow 136.

The beam 102 is directed through a second lens system, which includes the cylindrical lenses 138 and 140, by a mirror 142. The lenses 138 and 140 are provided to expand the probe beam so that separate portions of the beam can be directed through a pattern imposed by a spatial light modulator 144. In the particular configuration illustrated in FIG. 1, the beam 110 is to be routed to two optical detectors 148 and 152, which are part of an array of detectors 146, 148, 150, and 152. The connection to the detectors 148 and 152 is accomplished by means of a pattern of transparent and opaque regions which is established in the modulator 144, which also masks the remaining portions of the beam so that the detectors 146 and 150 do not recieve a signal.

After propagating through the modulator, the modulated probe beam is recombined with the expanded pump beam 122 inside the photorefractive crystal 134. The probe and pump beams are oriented with respect to the crystal 134 and with respect to each other such that photorefractive two-wave mixing within the crystal nonreciprocally transfers energy from the pump beam to the modulated beam. As a result, almost all of the energy in the pump beam is transferred to the probe beam, which is carrying the desired interconnection pattern. The modulated and amplified pump beam is then detected by the detectors 146-152. Those skilled in the art will appreciate that the angle between the probe beam 110 and the pump beam 122 should be arranged to optimize the two-wave mixing process within the particular crystal which is utilized. In addition, each portion of the probe beam must intersect the corresponding portion of the pump beam within the crystal 134 to achieve the proper transfer of energy from the pump beam to the modulated probe beam. If the crystal to be used is smaller than the cross sectional area of the beams, it is also possible to focus the pump and probe beams within the crystal to achieve the proper conditions for two-wave mixing within a crystal of reduced size.

The two-wave mixing process utilized in this device may be viewed as a real-time holographic phenomenon in which the recording and readout functions occur simultaneously inside the photorefractive crystal. In conjunction with the crystal, the beam splitter and the spatial light modulator cooperate to record a volume hologram which represents the interconnection pattern prescribed by the modulator. The energy coupling mechanism involved in the two-wave mixing process ensures that the diffraction efficiency during the readout of the crystal by the pump beam is almost 100%. Photorefractive crystals, such as $AgGaS_2$, $AgGaSe_2$, $\beta$-$BaB_2O_4$, $BaTiO_3$, $Bi_{12}SiO_{20}$, BGO, GaAs, KTN, $KTaO_3$, $LiNbO_3$, $LiTaO_3$, and $SrBaNb_2O_6$, are by far the most efficient of the various types of holographic media which are available. As those skilled in the art will appreciate, achieving such high efficiency levels requires that the crystal be properly oriented so that the energy of the readout beam is greatly depleted. The high level of energy efficiency occurs because most of the energy is carried by the readout beam, which does not pass through the modulator but is diffracted into the interconnection pattern by the hologram.

In this manner, only a small fraction of the energy of the original beam 110 is subjected to the attenuation introduced by the modulator 144. Consequently, the energy loss introduced by the spatial light modulator is limited to no more than the reflectivity of the beam splitter which is used in the device. Moreover, the beam splitter can be designed so that this reflectivity is small (5% or less, for example) so that this energy loss is minimized. Because of the nonreciprocal energy transfer which is accomplished in the photorefractive crystal, the optical transfer of information from the original beam to the detectors is thus achieved with a high degree of energy efficiency.

The energy efficiency of such an interconnection pattern can be estimated for a crossbar switch as follows. Let R be the reflectance of the beam splitter. It may be assumed that the beam splitter is practically lossless and that the face of the photorefractive crystal is antireflection-coated, so that the Fresnel reflection loss can be neglected. Under these conditions, the two beams that arrive at the photorefractive crystal have energies 1−R and Rt/N, respectively. Inside the crystal, these two beams undergo photorefractive coupling. As a result, most of the energy (1−R) of the pump beam is transferred to the probe beam, with energy Rt/N, which carries the interconnection pattern. The energy efficiency can be readily derived and is given by:

$$\eta = \frac{tR}{N} \frac{1+m}{1+me^{-\gamma L}} e^{-\alpha L} \qquad (1)$$

where m is the beam intensity ratio:

$$m = \frac{(1-R)N}{tR} \quad (2)$$

and L is the interaction length, $\gamma$ is the coupling constant, and $\alpha$ is the bulk absorption coefficient. For photorefractive crystals such as $AgGaS_2$, $AgGaSe_2$, $\beta\text{-}BaB_2O_4$, $BaTiO_3$, $Bi_{12}SiO_{20}$, BGO, GaAs, KTN, $KTaO_3$, $LiNbO_3$, $LiTaO_3$, and $SrBaNb_2O_6$, the coupling constant is very large (i.e., $\gamma L >> 1$ for L=1 cm). The efficiency can be written approximately as:

$$\eta = \left[\frac{tR}{N} + (1-R)\right] e^{-\alpha L} \quad (3)$$

Note that for large N, the ultimate energy efficiency is $\exp(-L)$, obtained by using a beam splitter with a very small reflectance R (i.e., $R \sim 0$).

In experimental work to investigate energy efficiency and the capability of high data rate transmission, a large beam from an argon ion laser operating at 514.2 nm was used. The laser beam was collimated into a beam of 2 mm in diameter by using a lens of focal length f=2 m. A beam splitter with a reflectance of R=0.05 was used to redirect 5% of the energy through the spatial light modulator and to form the probe beam. The remainder of the energy transmits through the beam splitter and constitutes the pump beam. The spatial light modulator was replaced with a neutral density filter with a variable optical density to simulate the fanout energy loss. The two beams intersected inside a barium titanate crystal with an interaction length of approximately 5 mm. The pump beam entered the crystal at near normal incidence with an intensity of $9.1 W/cm^2$. The probe beam, which had an intensity of $0.5 W/cm^2$, was incident at an angle of 40 degrees. The crystal was oriented such that the probe beam was amplified at the expense of the pump beam. After passing through the crystal, the pump beam was virtually depleted, whereas the intensity of the probe beam was elevated to $1.9 W/cm^2$. The same experiment was repeated by using neutral density filters with transmittances of 0.1 and 0.001. The corresponding probe beam densities were 0.05 and $0.005 W/cm^2$, respectively. The intensity of the amplified probe beam remained at $1.9 W/cm^2$. These measurements reflect an energy efficiency of about 20%. In other words, if the fanout loss is 99% (e.g., a $100 \times 100$ crossbar), the energy efficiency of this interconnect can be at least 20 times better than the direct approach. It should be noted that in these experiments the crystal was not antireflection coated and about 18% of the energy was lost at the front surface of the crystal. Bulk absorption in the crystal which was used accounted for approximately 60% of the energy loss.

The interconnection pattern in this device can readily be reconfigured by simply substituting a different pattern in the spatial light modulator. In such an interconnection, the output of each input beam can be delivered to any one or all of the detectors. The time for the interconnect to reconfigure when a new interconnect pattern is introduced is governed by the holographic formation time within the photorefractive crystal, which can be very fast, i.e., on the order of 1 msec using light energy of approximately $1 W/cm^2$. Once an interconnection pattern is formed inside the crystal as a hologram, this device can accomplish the interconnection function with sufficient speed to operate on high data rate transmission systems. Even though the reconfiguration time is limited by the photorefractive response time and is consequently on the order of milliseconds at modest intensities, the photorefractive interconnection system can accept very high data rate signals. To demonstrate this ability, temporal modulation was impressed on an Argon laser beam with a wavelength of 514.5 nm, using an acoustooptic device to stimulate a signal to be interconnected with some output. The signal used was a pulse train of frequency $f_0 = 0.833$ MHz, with each pulse being approximately 0.2 microseconds wide. This rate is clearly much higher than the reciprocal of the photorefractive response time. The modulated laser beam was then split into two beams and mixed in the crystal as described before and the amplified probe beam was monitored with a photodetector. The results showed a steady-state response in which the temporally modulated pump and probe beams interacted simply by diffracting off the stationary index grating that was created in the crystal after the photorefractive response time.

Figure 2:
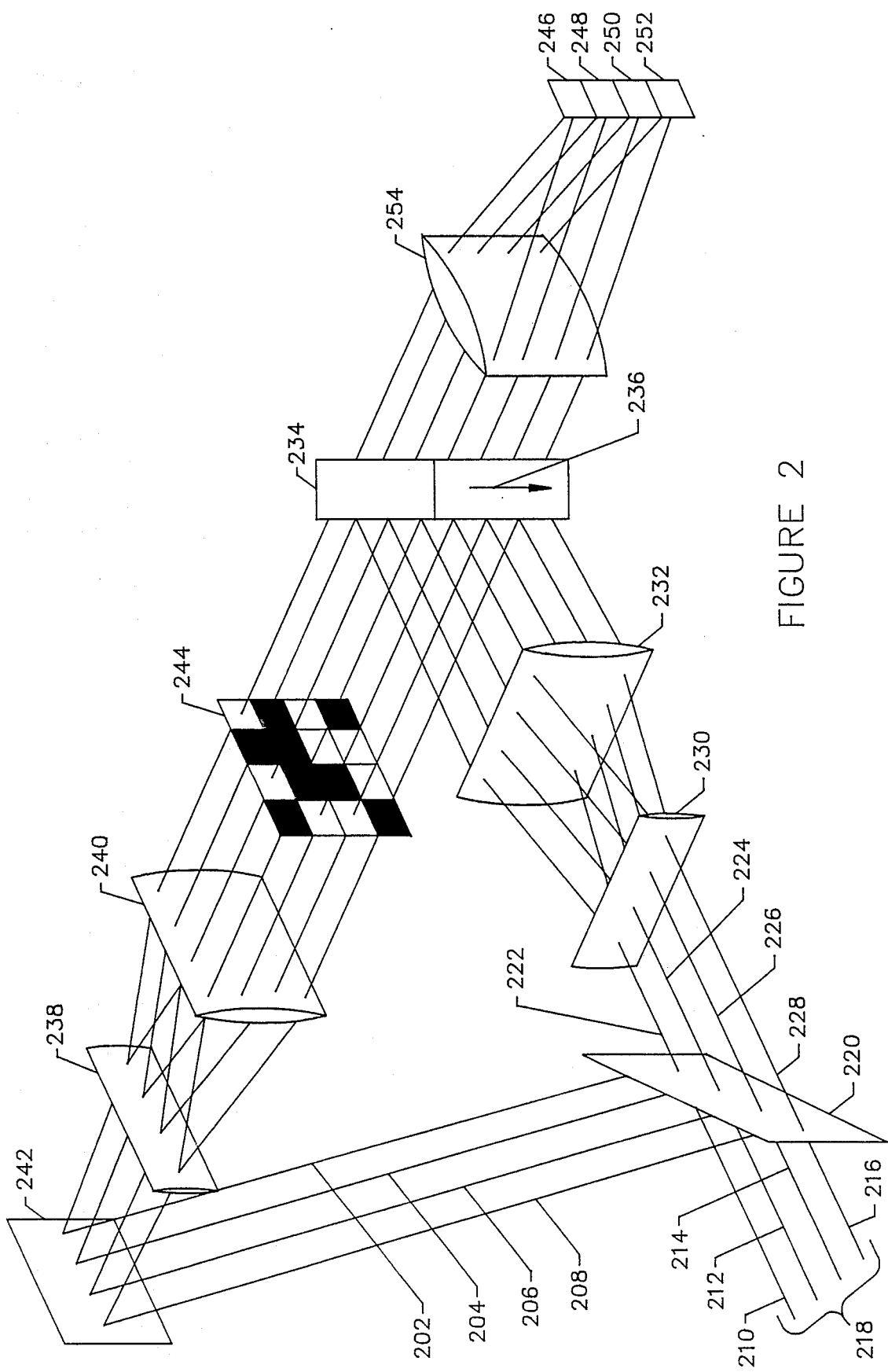
FIG. 2 illustrates another embodiment of the optical interconnect of this invention which is similar to the embodiment of FIG. 1, but effects a two dimensional optical interconnection.

FIG. 2 illustrates another embodiment of the optical interconnect of this invention which is similar to the embodiment of FIG. 1, but effects a two dimensional optical interconnection. In FIG. 2, small fractions 202, 204, 206, and 208 of the intensities of the laser beams 210, 212, 214, and 216 in the laser beam array 218 are coupled out of each beam by a beam splitter 220, leaving the remaining portions of the beams, the pump beams 222, 224, 226, and 228, propagating through the beam splitter. The pump beams are directed through a first lens system, including the cylindrical lenses 230 and 232, in order to expand the pump beams in the vertical direction before they propagate into a photorefractive crystal 234, which is oriented with its c axis directed as indicated by the arrow 236. The probe beams 202-208 are directed through a second lens system, including the cylindrical lenses 238 and 240, by a mirror 242.

The lenses 238 and 240 expand the probe beams vertically, after which the probe beams are directed through a two dimensional spatial light modulator 244. In the $4 \times 4$ interconnection shown, it is assumed for illustrative purposes that it is desired to connect the beams 210-216 to an array of detectors 246, 248, 250, and 252. More specifically, in the example depicted by FIG. 2 the beam 210 is to be connected to detectors 246 and 250, beam 212 to detectors 250 and 252, beam 214 to detectors 246 and 252, and beam 216 to detectors 248 and 250. In terms of a matrix-vector multiplication, this interconnection pattern can be written as:

$$v' = \begin{bmatrix} 0 & 1 & 0 & 1 \\ 1 & 0 & 0 & 0 \\ 1 & 0 & 1 & 1 \\ 0 & 1 & 1 & 0 \end{bmatrix} \begin{bmatrix} v_1 \\ v_2 \\ v_3 \\ v_4 \end{bmatrix} = \begin{bmatrix} v_2 + v_4 \\ v_1 \\ v_1 + v_3 + v_4 \\ v_2 + v_3 \end{bmatrix} \quad (4)$$

where $v_1$, $v_2$, $v_3$, and $v_4$ are the signals carried by the beams 210-216, respectively. The modulator 244 is patterned with the proper opaque and transparent regions to achieve the appropriate routing of each signal. The modulated probe beams, after traversing the modulator, are then recombined with the expanded pump beams 222-228 inside the crystal 234.

The probe and pump beams are oriented with respect to the crystal 234 and with respect to each other such that photorefractive two-wave mixing within the crystal nonreciprocally transfers energy from each pump beam to its corresponding modulated probe beam. As a result, almost all of the energy in the pump beams is transferred to the probe beams, which are carrying the desired interconnection pattern. The modulated and amplified pump beams are then focussed from a two-dimensional array of beams into a vector (a one-dimensional array) by a third lens system 254. Finally, the beams are detected by the detectors 246–252. An advantage of this device is that the beams within the array 218 need not be in phase with one another, since each beam interacts within the photorefractive crystal only with a portion split off from that same beam.

The preferred embodiments of this invention have been illustrated and described above. Modifications and additional embodiments, however, will undoubtedly be apparent to those skilled in the art. Optical phase conjugation, for example, could be used in conjunction with the two-wave mixing process to correct for any phase aberration that might be caused by imperfections in the photorefractive elements, as described in Chiou and Yeh, Optics Letters, Volume 11, Page 461 (1986). In addition, the concept of this invention can readily be expanded and applied to an interconnect with a larger number of input beams and/or a larger number of detectors. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

I claim:

1. A reconfigurable optical interconnect for coupling at least one input beam of coherent light into an array of light detectors, comprising:
    a beam splitter for dividing each input beam into a probe beam containing a relatively small portion of the intensity of the input beam and a pump beam containing a relatively large portion of the intensity of the input beam;
    a first cylindrical lens system positioned in the path of each probe beam for expanding each probe beam in a first direction perpendicular to the direction of propagation of the beam;
    a second cylindrical lens system positioned in the path of each pump beam for expanding each pump beam in the first direction;
    a spatial light modulator for varying the intensity of each expanded probe beam in the first direction; and
    a photorefractive element positioned to receive each modulated probe beam and each expanded pump beam, the beams being oriented with respect to the photorefractive element and with respect to each other such that photorefractive two-wave mixing within the photorefractive element nonreciprocally transfers energy from each expanded pump beam to the corresponding modulated probe beam, each probe beam thereby being amplified before impinging on the detector array.

2. The optical interconnect of claim 1, wherein the photorefractive element further comprises a photorefractive crystal.

3. The interconnect of claim 2 wherein the photorefractive crystal is selected from the group consisting of $AgGaS_2$, $AgGaSe_2$, $\beta\text{-}BaB_2O_4$, $BaTiO_3$, $Bi_{12}SiO_{20}$, BGO, GaAs, KTN, $KTaO_3$, $LiNbO_3$, $LiTaO_3$, and $SrBaNb_2O_6$.

4. The optical interconnect of claim 1, further comprising:
    a first lens system positioned in the path of each probe beam between the spatial light modulator and the photorefractive element for focussing the probe beam in the photorefractive element; and
    a second lens system positioned in the path of each pump beam between the beam splitter and the photorefractive element for focussing the pump beam in the photorefractive element.

5. A reconfigurable optical interconnect for coupling at least one input beam of coherent light into an array of light detectors, comprising:
    means for dividing each input beam into a probe beam containing a relatively small portion of the intensity of the input beam and a pump beam containing a relatively large portion of the intensity of the input beam;
    first means positioned in the path of each probe beam for expanding each probe beam in a first direction perpendicular to the direction of propagation of the beam;
    second means positioned in the path of each pump beam for expanding each pump beam in the first direction;
    modulating means for varying the intensity of each expanded probe beam in the first direction; and
    photorefractive means positioned to receive each modulated probe beam and each expanded pump beam, the beams being oriented with respect to the photorefractive means and with respect to each other such that photorefractive two-wave mixing within the photorefractive means nonreciprocally transfers energy from each expanded pump beam to the corresponding modulated probe beam, each probe beam thereby being amplified before impinging on the detector array.

6. A reconfigurable optical interconnect for coupling an array of coplanar, parallel input beams of coherent light into an array of light detectors, comprising:
    a beam splitter for dividing the input beams into an array of probe beams containing a relatively small portion of the intensity of the input beams and an array of pump beams containing a relatively large portion of the intensity of the input beams;
    a first cylindrical lens system positioned in the path of the probe beam array for expanding the probe beam array in a first direction perpendicular to the direction of propagation of the array;
    a second cylindrical lens system positioned in the path of the pump beam array for expanding the pump beam array in the first direction;
    a two dimensional spatial light modulator for varying the intensity of the expanded probe beam array in the first direction and in a second direction perpendicular to the first direction and perpendicular to the direction of propagation of the probe beam array; and
    a photorefractive element positioned to receive the modulated probe beams and the expanded pump beams, the beams being oriented with respect to the photorefractive element and with respect to each other such that photorefractive two-wave mixing within the photorefractive element nonreciprocally transfers energy from each expanded pump beam to the corresponding modulated probe beam.

7. The interconnect of claim 6, wherein the photorefractive element further comprises a photorefractive crystal.

8. The interconnect of claim 7, wherein the photorefractive crystal is selected from the group consisting of $AgGaS_2$, $AgGaSe_2$, $\alpha$-$BaB_2O_4$, $BaTiO_3$, $Bi_{12}SiO_{20}$, BGO, GaAs, KTN, $KTaO_3$, $LiNbO_3$, $LiTaO_3$, and $SrBaNb_2O_6$.

9. The optical interconnect of claim 6, further comprising a third lens system positioned in the path of each probe beam between the photorefractive element and the detector array to compress the modulated and amplified probe beam in the second direction.

10. The optical interconnect of claim 9, further comprising:
a fourth lens system positioned in the path of each probe beam between the spatial light modulator and the photorefractive element for focussing the probe beam in the photorefractive element; and
a fifth lens system positioned in the path of each pump beam between the beam splitter and the photorefractive element for focussing the pump beam in the photorefractive element.

11. A reconfigurable optical interconnect for coupling an array of coplanar, parallel input beams of coherent light into an array of light detectors, comprising:
means for dividing the input beams into an array of probe beams containing a relatively small portion of the intensity of the input beams and an array of pump beams containing a relatively large portion of the intensity of the input beams;
first means positioned in the path of each probe beam array for expanding the array in a first direction perpendicular to the direction of propagation of the array;
second means positioned in the path of each pump beam array for expanding the array in the first direction;
modulating means for varying the intensity of the expanded probe beam array in the first direction and in a second direction perpendicular to the first direction and perpendicular to the direction of propagation of the probe beam array; and
photorefractive means positioned to receive the modulated probe beams and the expanded pump beams, the beams being oriented with respect to the photorefractive means and with respect to each other such that photorefractive two-wave mixing within the photorefractive means nonreciprocally transfers energy from each expanded pump beam to the corresponding modulated probe beam.

12. A method of reconfigurably coupling at least one input beam of coherent light into an array of light detectors, comprising the steps of:
dividing each input beam into a probe beam containing a relatively small portion of the intensity of the input beam and a pump beam containing a relatively large portion of the intensity of the input beam;
expanding each probe beam in a first direction perpendicular to the direction of propagation of the beam;
expanding each pump beam in the first direction;
varying the intensity of each expanded probe beam in the first direction to yield a modulated probe beam;
directing each modulated probe beam and each expanded pump beam into a photorefractive element;
orienting the beams with respect to the photorefractive element and with respect to each other such that photorefractive two-wave mixing within the photorefractive element nonreciprocally transfers energy from each expanded pump beam to the corresponding modulated probe beam; and
directing each modulated probe beam onto the detector array.

13. The method of claim 12, further comprising, between the steps of varying the intensity of each probe beam and directing each probe beam and each pump beam into the photorefractive element, the steps of:
focussing each probe beam in the photorefractive element; and
focussing each pump beam in the photorefractive element.

14. A method of reconfigurably coupling an array of coplanar, parallel input beams of coherent light into an array of light detectors, comprising the steps of:
dividing the input beams into an array of probe beams containing a relatively small portion of the intensity of the input beams and an array of pump beams containing a relatively large portion of the intensity of the input beams;
expanding each probe beam in a first direction perpendicular to the direction of propagation of the beam;
expanding each pump beam in the first direction;
varying the intensity of each expanded probe beam in the first direction and in a second direction perpendicular to the first direction and perpendicular to the direction of propagation of the probe beams to yield a modulated probe beam;
directing the modulated probe beams and the expanded pump beams into a photorefractive element;
orienting the beams with respect to the photorefractive element and with respect to each other such that photorefractive two-wave mixing within the photorefractive element nonreciprocally transfers energy from each expanded pump beam to the corresponding modulated probe beam; and
directing the modulated probe beam array onto the detector array.

15. The method of claim 14, further comprising, between the steps of orienting the beams and directing the modulated probe beam array, the step of compressing the modulated and amplified probe beams in the second direction.

16. The method of claim 14, further comprising, between the steps of varying the intensity of each probe beam and directing each probe beam and each pump beam into the photorefractive element, the steps of:
focussing each probe beam in the photorefractive element; and
focussing each pump beam in the photorefractive element.

* * * * *